United States Patent [19]

Yagi et al.

[11] Patent Number: 5,313,451
[45] Date of Patent: May 17, 1994

[54] INFORMATION RECORDING/REPRODUCING APPARATUS WITH STM CANTILEVER PROBE HAVING A STRAIN GAUGE

[75] Inventors: Takayuki Yagi, Machida; Toshiyuki Komatsu, Hiratsuka, both of Japan

[73] Assignee: Canon Kabushiki Kaisha, Tokyo, Japan

[21] Appl. No.: 942,821

[22] Filed: Sep. 10, 1992

Related U.S. Application Data

[63] Continuation of Ser. No. 685,048, Apr. 15, 1991, abandoned.

[30] Foreign Application Priority Data

Apr. 18, 1990 [JP] Japan .................. 2-104061

[51] Int. Cl.⁵ .................. G11B 9/00; G01B 7/34; H01J 37/28
[52] U.S. Cl. .................. 369/126; 369/101; 250/306; 250/310
[58] Field of Search .................. 369/101, 126; 365/151; 250/306, 310; 324/158 P, 158 F; 73/862.63, 766; 310/317, 318; 360/103, 77.16

[56] References Cited

U.S. PATENT DOCUMENTS

| | | | |
|---|---|---|---|
| 3,632,900 | 1/1972 | Kurzwell et al. | 360/103 |
| 4,404,601 | 9/1983 | Sakamoto | 360/77.16 |
| 4,663,555 | 5/1987 | Yoshihiro | 360/77.17 |
| 4,764,818 | 8/1988 | Crew | 369/101 X |
| 4,831,614 | 5/1989 | Duerig et al. | 369/101 X |
| 4,841,191 | 6/1989 | Takata et al. | 310/317 |
| 4,962,480 | 10/1990 | Ooumi et al. | 369/126 X |
| 4,992,659 | 2/1991 | Abraham et al. | 250/306 |
| 4,998,016 | 3/1991 | Nose | 369/126 |
| 5,010,296 | 4/1991 | Okada et al. | 324/158 P |
| 5,015,850 | 5/1991 | Zdeblick et al. | 369/101 X |
| 5,031,463 | 7/1991 | Hess | 73/862.63 |
| 5,053,995 | 10/1991 | Kajimura et al. | 250/310 |
| 5,115,664 | 5/1992 | Hegde et al. | 360/137 |
| 5,142,424 | 8/1992 | Hatamura | 360/103 |
| 5,161,149 | 11/1992 | Potember et al. | 369/126 |
| 5,162,653 | 11/1992 | Hosaka et al. | 250/306 |
| 5,168,159 | 12/1992 | Yagi | 250/306 |
| 5,255,259 | 10/1993 | Hatanaka et al. | 369/126 |
| 5,260,926 | 11/1993 | Kuroda et al. | 369/126 |

FOREIGN PATENT DOCUMENTS

| | | |
|---|---|---|
| 247219 | 12/1987 | European Pat. Off. . |
| 272935 | 6/1988 | European Pat. Off. . |
| 360975 | 4/1990 | European Pat. Off. . |
| 37-281138 | 12/1962 | Japan . |
| 2-38904 | 2/1990 | Japan .................. 250/306 |

OTHER PUBLICATIONS

Calvin F. Quate, 4th International Conference on Scanning Tunneling Microscopy/Spectroscopy, 1989, 510-2.

Patent Abstracts of Japan (No. 2-38904), "Fine Displacing Mechanism and Scan Type Tunnel Microscope Using Same" (Kazuo Sato), vol. 14, No. 195, (Apr. 20, 1990).

(List continued on next page.)

Primary Examiner—Paul M. Dzierzynski
Assistant Examiner—Kim-Kwok Chu
Attorney, Agent, or Firm—Fitzpatrick, Cella, Harper & Scinto

[57] ABSTRACT

An apparatus for relatively moving a probe facing an information carrier and recording information on and/or reproducing information from the information carrier with the probe provided with a detector for detecting an error in the probe.

20 Claims, 6 Drawing Sheets

OTHER PUBLICATIONS

Kazuyoshi Sugihara, et al., "Piezoelectrically driven XY-teta Table for Submicron Lithography Systems," Review of Scientific Instruments, 60, No. 9, pp. 3024–3029 (Sep. 1989).

E. E. Ehrichs, et al., "Etching of Silicon (111) with the Scanning Tunneling Microscope", Journal of Vacuum Science & Technology A, Second Series, vol. 8, No. 1, pp. 571–573 (Jan./Feb. 1990).

Thomas R. Albrecht, et al., "Microfabrication of Integrated Scanning Tunneling Microscope", Journal of Vacuum Science & Technology A, Second Series, vol. 8, No. 1, pp. 317–318 (Jan./Feb. 1990).

M. Elwenspoek, et al., "Transduction Mechanisms and their Applications in Micromechanical Devices", Micro Electro Mechanical Systems, IEEE Robotics and Automation Council, pp. 126–132 (Feb. 20–22, 1989).

Kyoritsu Yamaka, "High Technology Sensor", p. 116 (Jan. 6, 1986).

Thomas R. Albrecht, "Microfabrication of Integrated Scanning Tunneling Microscope", STM '89 Fourth International Conference on Scanning Tunneling Microscopy/Spectroscopy, p. 146 (Jul. 1989).

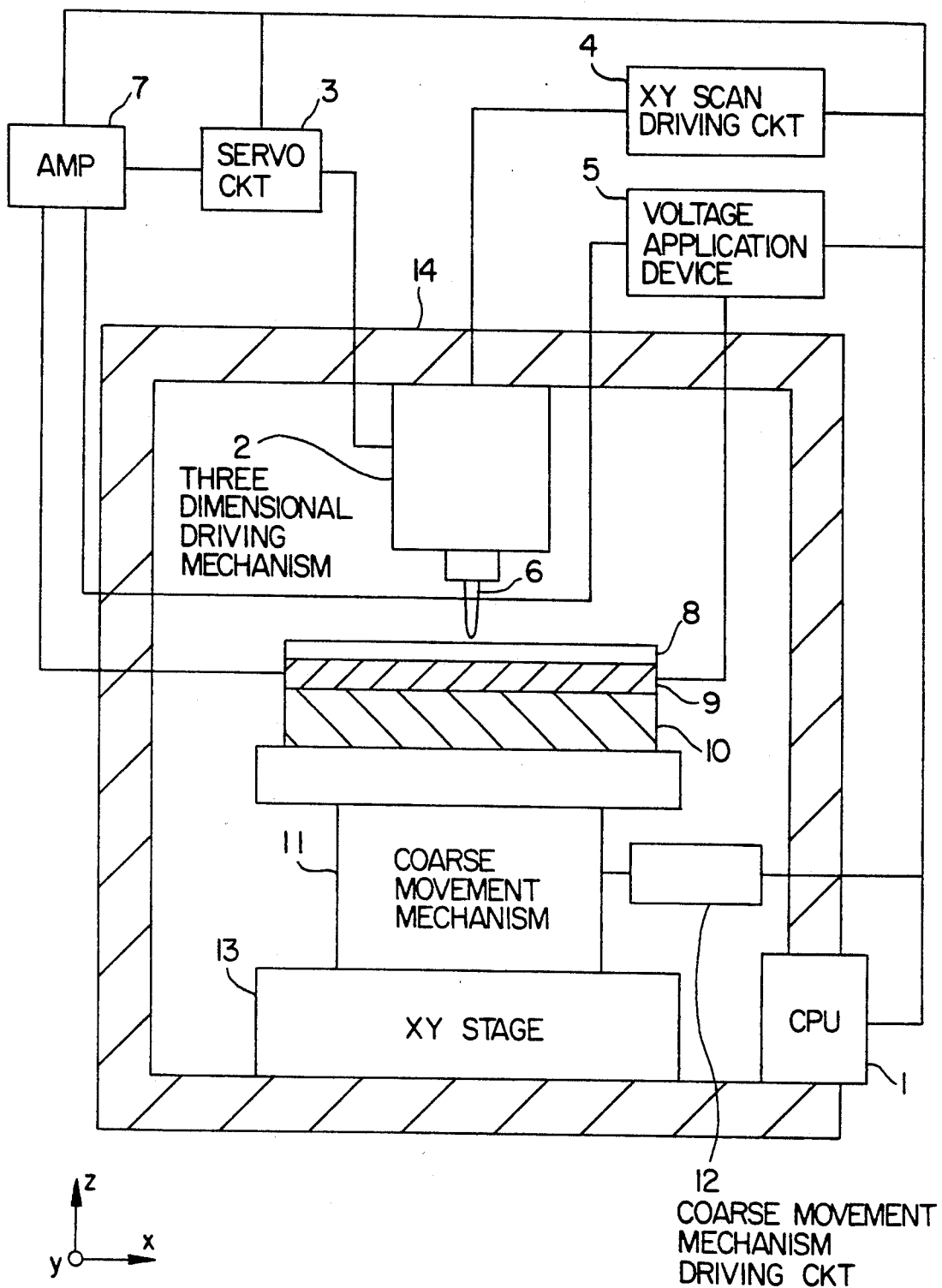
F I G. 1

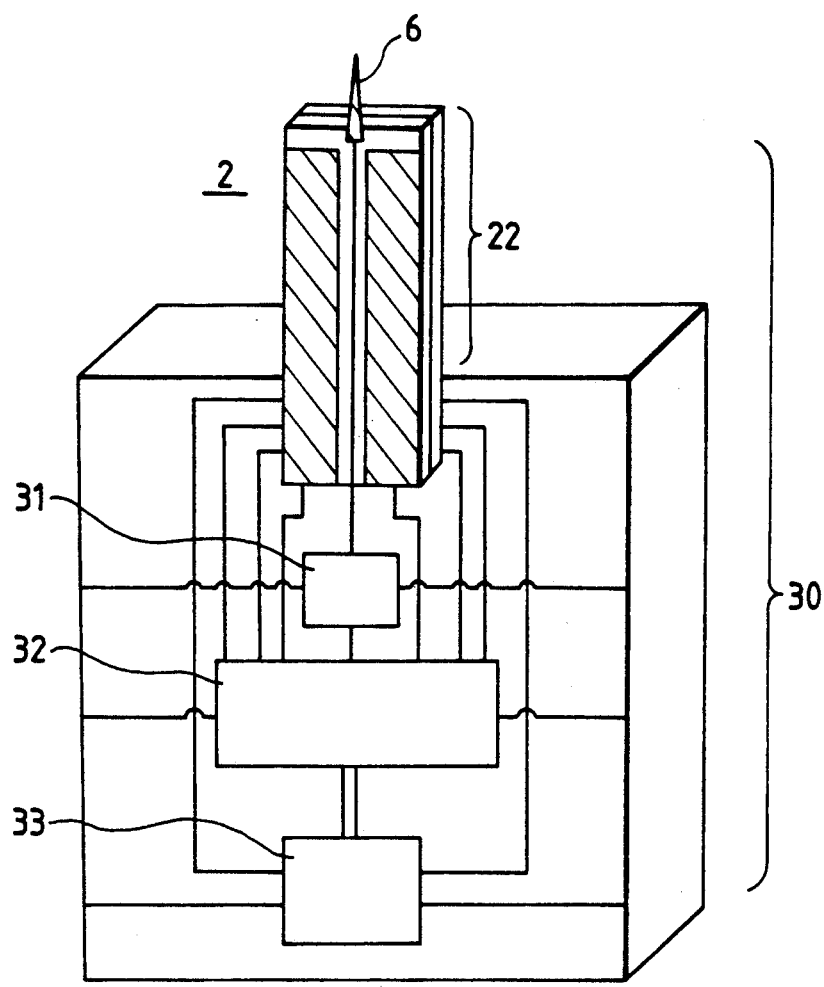

ns of the above requirements are expanded below.

INFORMATION RECORDING/REPRODUCING APPARATUS WITH STM CANTILEVER PROBE HAVING A STRAIN GAUGE

This application is a continuation of U.S. application Ser. No. 07/685,048 filed Apr. 15, 1991, now abandoned.

BACKGROUND OF THE INVENTION

1. Field of the Invention

The present invention relates to an apparatus for observing a surface of a material, finely machining the material and recording and reproducing information by a technique of a scanning tunneling microscope (STM) or the like.

2. Related Background Art

The observation, evaluation and fine machining of a semiconductor or high molecule material in the order of an atom or a molecule by using the STM technique (E. E. Ehrichs, 4th International Conference on Scanning Tunneling Microscopy/spectroscopy, '89, S13-3) and applications thereof to various fields such as a recorder have been studied.

Among others, a demand for a large capacity recorder for computer calculation information and image information is increasing more and more, and size reduction of the recorder is desired because of the fact that a size of a microprocessor has been reduced and a computing ability of the microprocessor has been improved. In order to meet the above requirements, a recording and reproducing apparatus has been proposed which records information on a recording area of 10 nm$^2$ at minimum by applying a voltage from a transducer having a tunneling current generating probe mounted on drive means to finely adjust spacing to a recording medium in order to change a work function of a recording medium surface, and reads the information by detecting a change in a tunneling current due to the change in the work function.

The above transducer is very effective means for not only the recorder but also material evaluation and fine machining of a nanometer order.

In the above apparatus, it is necessary to adjust spacing between a probe and a medium so that processing is always performed at proper spacing. For example, in the recording and reproducing apparatus described above, if the drive means malfunctions to separate the probe from the medium more than required, the information cannot be written onto the recording medium. If a similar malfunction occurs in the information record mode, the information is not correctly read and all signals read from the recording medium may be "0". Such malfunction may occur not only in the spacing adjustment but also when the probe is scanned parallel to the medium surface. In the past, when such malfuction occurs, the written information is read by another apparatus for analysis or the read information is checked if it is not normal for a predetermined time period in order to detect the malfunction. Accordingly, a long time is taken to detect the error and it is time consuming.

SUMMARY OF THE INVENTION

In light of the above, it is an object of the present invention to provide an information recording and reproducing apparatus which can quickly detect an error (such as an error due to inproper spacing adjustment) to take counter measurement.

BRIEF DESCRIPTION OF THE DRAWINGS

FIG. 1 shows a schematic diagram of a recording and reproducing apparatus in accordance with one embodiment of the present invention, FIG. 9 shows a probe chip system in accordance with a second embodiment of the present invention.

DETAILED DESCRIPTION OF THE PREFERRED EMBODIMENTS

Figure 2:
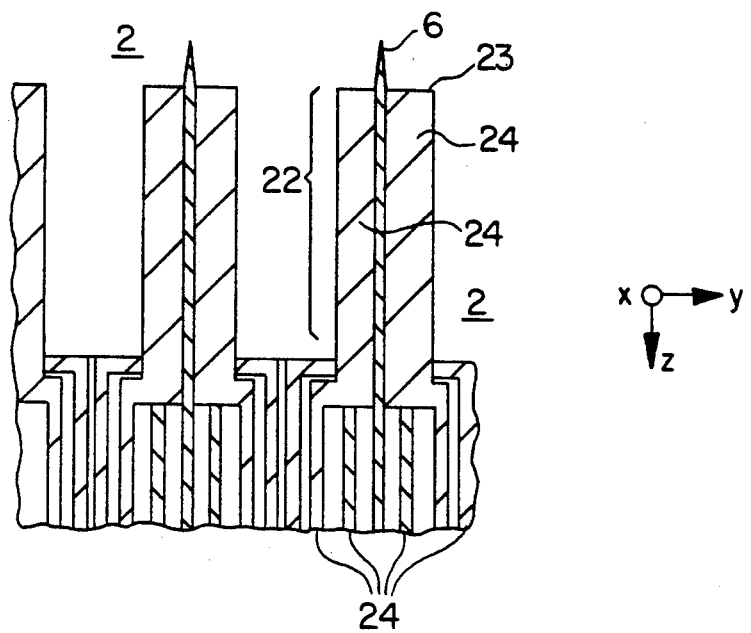
FIG. 2 shows a periphery of a tunneling current generating probe electrode of the apparatus.

The embodiments of the present invention are now explained with reference to the drawings.

FIG. 1 shows a schematic diagram of a recording and reproducing apparatus and a recording medium in a first embodiment of the present invention. In FIG. 1, numeral 1 denotes a microcomputer which controls an overall apparatus, numeral 2 denotes a three-dimensional drive mechanism which includes a cantilever to be described later, numeral 3 denotes a servo circuit, numeral 4 denotes an X-Y scan drive circuit, numeral 5 denotes a voltage application device which applies a voltage across a probe and a recording medium, numeral 6 denotes a probe electrode which is three dimensionally displaceable by the three-dimensional drive mechanism 2, numeral 7 denotes a current amplifier, numeral 8 denotes a recording medium layer, numeral 9 denotes an underlying electrode, numeral 10 denotes a substrate, numeral 11 denotes a coarse displacement mechanism which includes a pulse motor and a lever mechanism to drive the recording medium in a Z direction, numeral 12 denotes a coarse displacement mechanism drive circuit, numeral 13 denotes an X-Y stage for driving the recording medium in X and Y directions, and numeral 14 denotes a closed frame which forms a closed structure. The probe 6 is brought to a predetermined distance from the recording medium 8 by the coarse displacement mechanism 11, and a rectangular pulse voltage having an amplitude of 3 volts and a width of 50 ns is applied as a write voltage by the voltage application device 5 so that electrical conductivity of the recording medium 8 is changed to create an area having a different electrical resistance. In this manner, information is written. The probe 6 is scanned in the X and Y directions by the X-Y stage 13 and the three-dimensional drive mechanism 2 and the write voltage is applied in accordance with the information to be written so that information is recorded two-dimensionally on the recording medium. On the other hand, in the reproducing mode, a DC voltage (bias voltage) having an amplitude of 200 mV which is lower than the write voltage is applied as a read voltage to the recording medium 8 by the probe 6. The three-dimensional drive mechanism 2 is feedback-controlled in the spacing direction (Z direction) such that a tunneling current detected by the current amplifier 7 and the servo circuit 3 under this condition is kept constant (0.1 nA), and the probe 6 is two-dimensionally scanned in the X and Y directions on the recording medium surface as it is done in the record mode. The amount of feedback in the Z direction varies in accordance with the recorded information (electrical conductivities) on the recording medium. Namely, the level of the probe goes up and down in accordance with the recording information value. The information can be reproduced by detecting the feedback signal or the Z position of the probe with respect to the record position (X-Y position). The control is effected by the microcomputer 1.

Alternatively, the information may be reproduced by scanning the probe in the X and Y directions while keeping it constant in the Z direction and detecting the tunneling current created in accordance with the conductivity of the recording medium.

In the present embodiment, the underlying electrode 9 is formed on a quartz glass substrate by depositing Cr to a thickness of 50 Å by a vacuum vapor deposition method and depositing Au to a thickness of 300 Å thereon by the same method. Four layers of SOAZ (squarilium-bis-6-octylazlen) are laminated thereon by an LB method to form the recording medium 8. The present invention is not limited to the above specific recording medium but various other recording media such as one disclosed in EP0272935A2 may be used.

In the present embodiment, only one set of the probe electrode 6 and the three-dimensional drive mechanism 2 is shown, although a plurality of sets are actually arranged to face the recording medium 8 so that information is recorded and reproduced simultaneously at a plurality of areas or the recording medium 8. Each set separately has the servo circuit 3, the X-Y scan drive circuit 4, the voltage application device 5 and the current amplifier 7, and the microcomputer 1 controls those units of the respective sets independently.

Figure 3:
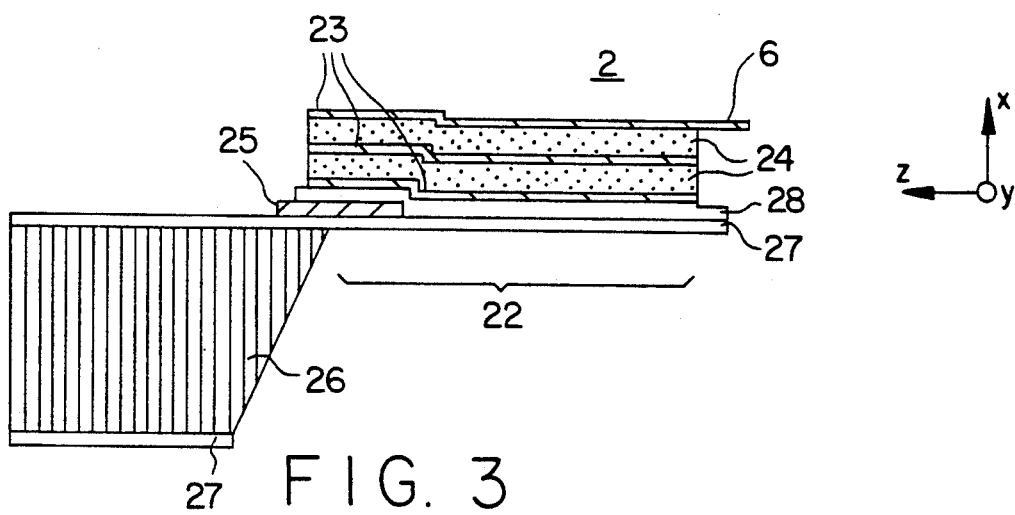
FIG. 3 shows a sectional view thereof.

FIG. 2 shows details of the three-dimensional drive mechanism 2 and the probe 6 shown in FIG. 1, and FIG. 3 shows a sectional view thereof.

The three-dimensional drive mechanism 2 comprises a cantilever 22, a bimorph piezoelectric film 23 which serves as the displacement means, and a drive electrode 24 therefor. A piezo resistive element or a piezoelectric film which functions as a strain gauge is formed to serve as displacement detection means 25. The probe electrode and the three-dimensional drive mechanism may be manufactured by micromechanics such as an Si anisotropy etching method taught by Calvin F. Quate, 4th International Conference on Scanning Tunneling Microscopy/Spectroscopy, '89, S10-2, and the displacement detection means 25 is patterned on an anisotropy etching mask layer 27. An insulation layer 28 is provided to insulate the displacement detection means 25 from the drive electrode 24.

Figure 4:
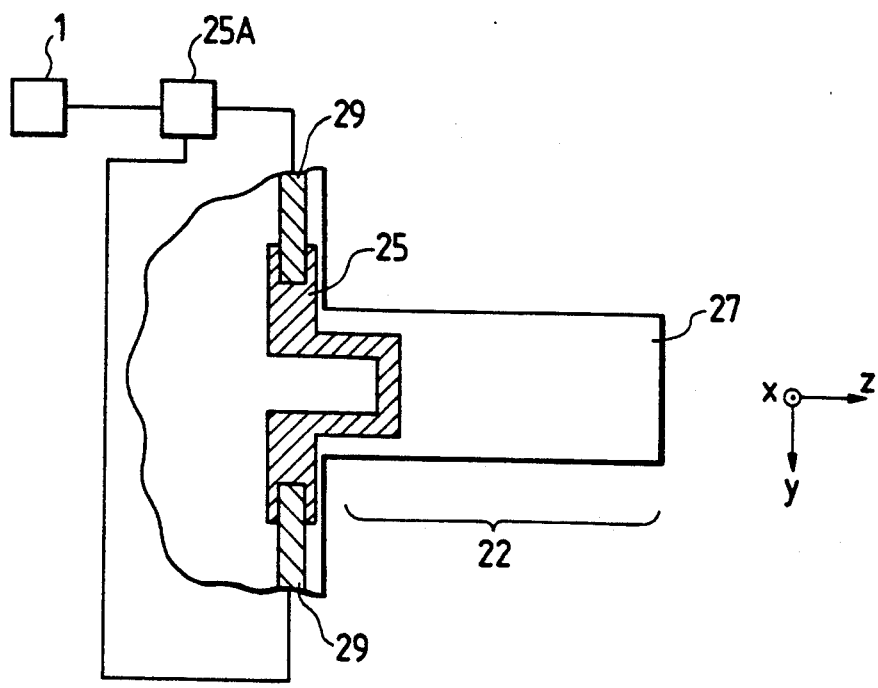
FIG. 4 shows a pattern of displacement detection means.

FIG. 4 shows a specific pattern of the displacement detection means 25. It shows X displacement detection means.

In the present embodiment, the piezo resistive element which functions as the strain gauge is used as the displacement detection means 25. A stress generated in the piezo resistive element when the cantilever 22 is displaced is detected as a change in the resistance of the piezo resistive element. It is read by a read circuit 25A under the control of the microcomputer 1. The piezo resistive element may be manufactured by forming a polycrystalline silicon layer having a thickness of several Å A by a reduced pressure CVD device and ion-implanting boron to attain a resistivity of several $m\Omega \cdot cm$.

Where the piezoelectric film is used as the displacement detection means 25, a stress generated by the displacement of the cantilever 22 is detected as a charge generated in the piezoelectric film from the electrode 29. The piezoelectric film may be manufactured by forming an A(N film in a nitrogen or argon atmosphere by a magnetron sputtering method.

Figure 5:
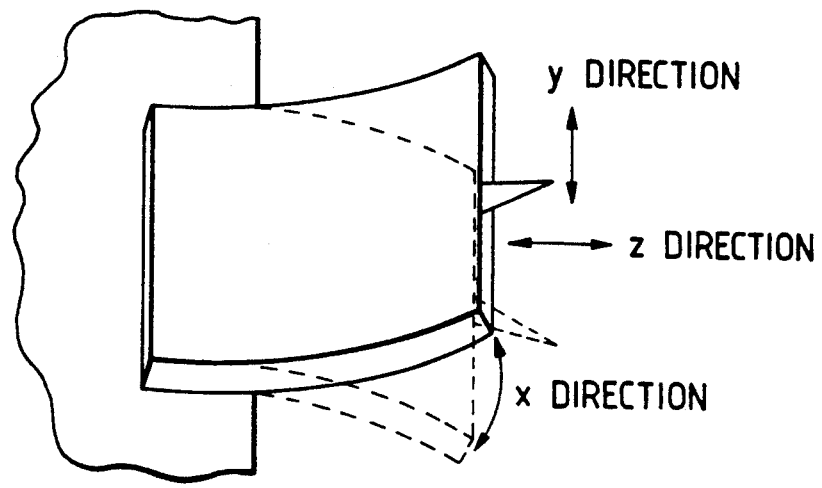
FIG. 5 shows a displacement operation of a three-dimension drive mechanism.
Figure 6:
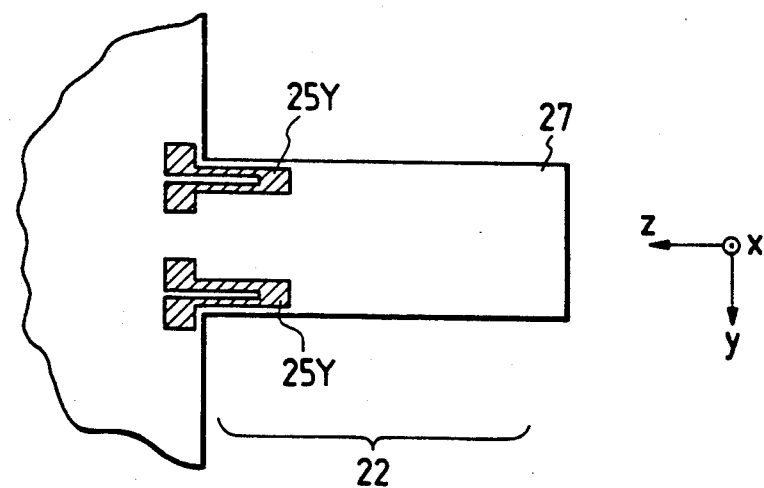
FIG. 6 shows a pattern of Y displacement detection means.
Figure 7:
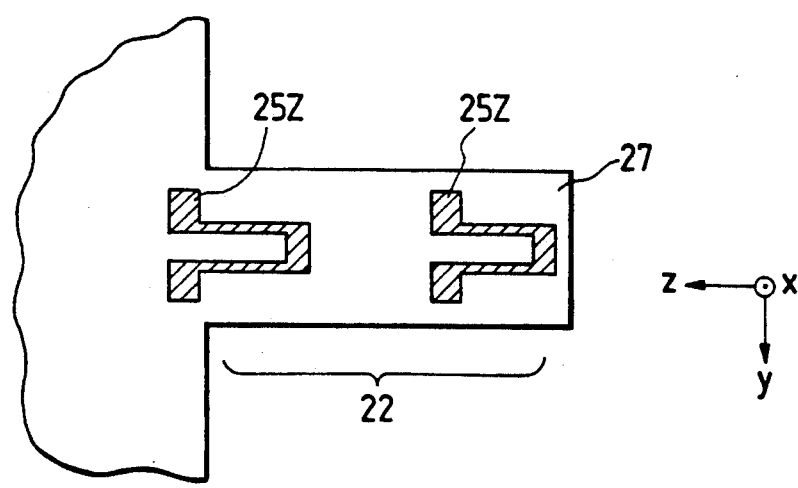
FIG. 7 shows a pattern of Z displacement detection means.

Each of the cantilevers 22 shown in FIG. 2 is independently displaceable in X, Y and Z directions as shown in FIG. 5. For the Y displacement, two displacement detection means 25Y are arranged widthwise (Y direction) of the cantilever 22 as shown in FIG. 6, and stresses at the respective positions are detected from the outputs of the respective detection means 25Y by the microcomputer 1 through read circuits (not shown) as does the detection means 25, and a difference between the stresses is calculated to detect the Y displacement. For the Z displacement, two displacement detection means 25Z are arranged in the Z direction as shown in FIG. 7, and the Z displacement is detected from a difference between the detected stresses in the same manner as that for the Y direction. The detection means 25Y and 25Z may be formed on the same plane as the detection means 25 or they may be laminated in layers with an interposed insulation layer. By combining the displacement detection means of FIGS. 4, 6 and 7, it is possible to detect the displacement of the probe in any of X, Y and Z directions.

In the present embodiment, the microcomputer 1 controls in the following manner. The information reproducing mode is first explained.

A start command signal is sent from the microcomputer 1 to the respective three-dimensional drive mechanism servo circuits 3. The command signal is also sent to the respective X-Y scan drive circuits 4. A control voltage is applied from the servo circuit 3 to the bimolf piezoelectric film 24 of the cantilever 22 to keep a current flowing between the probe 6 and the recording medium 8 at a constant level. A control voltage is also applied by the X-Y scan drive circuit 4 to the piezoelectric film 24 in order to drive the probe electrode 6 in the X and Y directions. In this manner, the information is reproduced based on the spacing between the probe 6 and the recording medium 8. The control voltages are also sent to the microcomputer 1. The displacement detection means on the cantilevers 22 also sends the displacement information to the microcomputer 1. The microcomputer 1 calculates anticipated X, Y and Z displacements of the cantilever 22 for each three-dimensional drive mechanism based on the control voltages sent thereto to produce anticipated values. It compares effective values of the actual displacements detected by the displacement detection means of the cantilever with the anticipated values, and if a difference is beyond a predetermined range, it determines an error in the operation of the three-dimensional drive mechanism. The microcomputer 1 identifies the malfunctioned three-dimensional drive mechanism by a display (not shown) or by voice for warning. In the reproducing mode, the signal from the probe electrode of the malfunctioned three-dimension drive mechanism is not reproduced. The servo circuit and the X-Y scan drive circuit for the malfunctioned three-dimensional drive mechanism are deactivated.

The control by the microcomputer 1 in the information record mode is now explained.

The servo circuit 3 is first activated and it is deactivated when the tunneling current reaches a predetermined level and the probe electrode 6 is fixed so as not to displace in the Z direction. This is done by a command signal from the microcomputer 1. Under this condition, the probe electrode 6 is scanned in the X and Y directions as it is done in the reproducing mode. An anticipated value of the displacement calculated based on the control voltage is compared with an effective value of an actual displacement detected by the displacement detection means to detect an error of each three-dimensional drive mechanism. The detection operation is the same as that in the reproduction mode except that the displacement calculated based on the Z direction control voltage after the deactivation of the servo circuit 3 is constant. The microcomputer 1 identifies the malfunctioned three-dimensional drive mechanism by the display (not shown) or by voice output for warning. The recording voltage is not applied to the associated probe electrode, and the associated servo circuit and X-Y scan drive circuit are deactivated.

Figure 8:
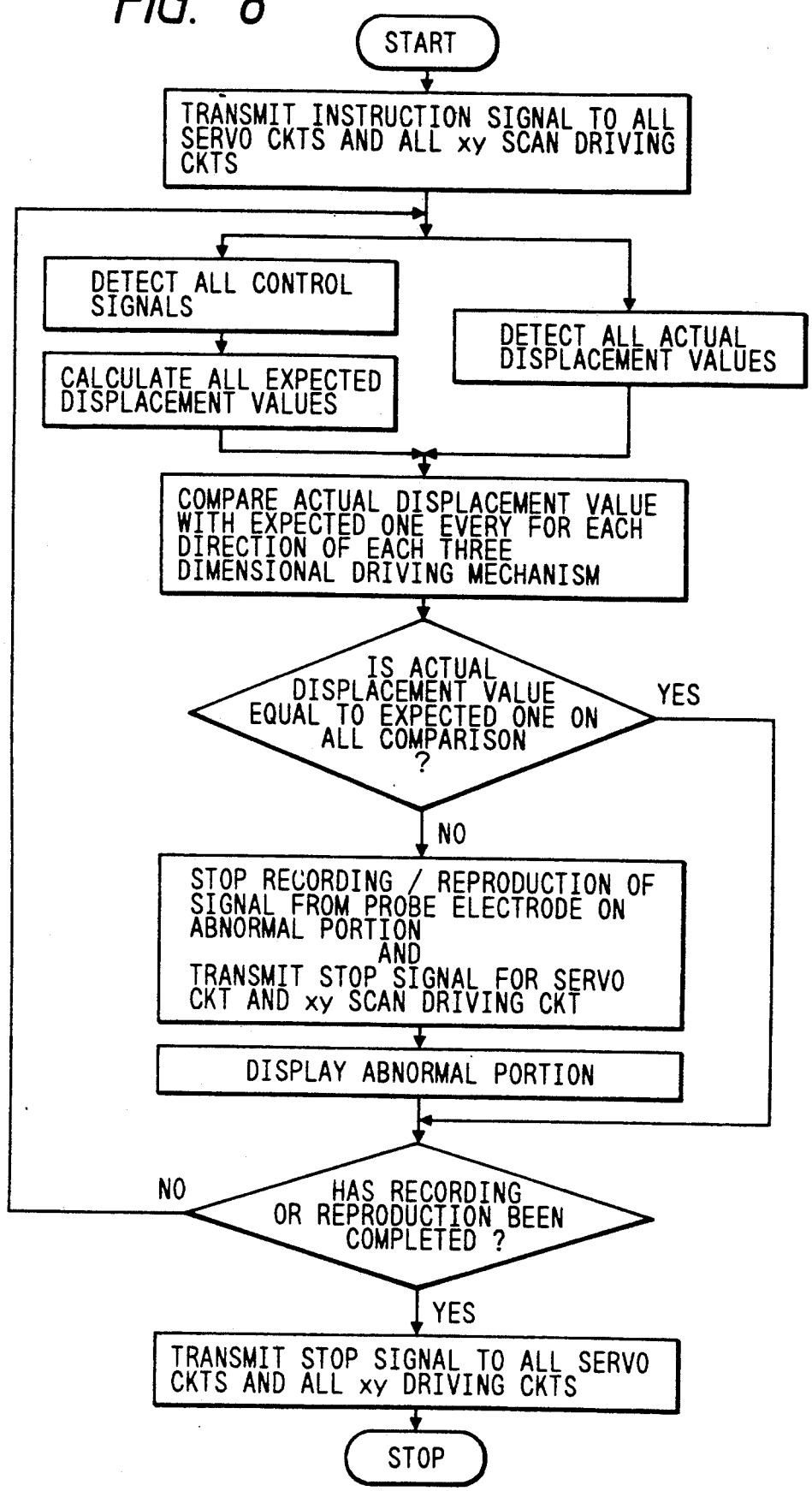
FIG. 8 shows a flow chart of the apparatus.

The above control is shown in a flow chart of FIG. 8.

In the apparatus of the present embodiment, an error may be detected when the three-dimensional drive mechanism malfunctions as well as when the Z direction position control by the servo circuit 3 is disabled by an accident such as breaking of the probe electrode. Thus, the malfunction of the three-dimensional drive mechanism as well as the trouble in the probe electrode can be detected.

A second embodiment of the present invention is now explained.

FIG. 9 shows a partial construction to illustrate a vicinity of the probe electrode 6 in the second embodiment. In the present embodiment, a plurality of probes are used, but since they are identical in construction, only one of them is shown. The probe electrode 6 and the three-dimensional drive mechanism 2 are identical to those of the first embodiment. Numeral 31 denotes a tunneling current detection circuit which includes the current amplifier 7 of the first embodiment and a current-voltage conversion circuit which converts a current signal to a voltage signal, numeral 32 a probe electrode control circuit which includes the servo circuit 3 for controlling the Z direction position of the probe electrode 6 based on an output of the detection circuit 31 and the X-Y scan drive circuit for controlling the X-Y scan of the probe electrode 6, and numeral 33 denotes a correction circuit. Signal lines extending laterally from the circuits 31, 32 and 33 are connected to the microcomputer 1. The cantilever 22 and the circuits 31, 32 and 33 are formed integrally on the substrate to form a probe chip system 30. The other construction is identical to that of the first embodiment.

In the present embodiment, the correction circuit 33 receives the control voltage applied from the control circuit 32 to the bimolf piezoelectric film of the cantilever 22 and the outputs of the displacement detection means, and compares the anticipated values of the displacements with the effective values of the actual displacements. In this manner, an error in the three-dimensional drive mechanisms is detected. For the malfunctioned three-dimensional drive mechanism detected by the comparison, a feedback command signal is issued to the control circuit 32 so that the cantilever 22 is further displaced by a difference between the effective value and the anticipated value. This is repeated until the effective value and the anticipated value match to attain the feedback correction. By such a feedback system, any error can be automatically corrected.

For the purpose of temperature compensation of the displacement detection means, the strain gauge shown in FIGS. 4, 6 and 7 may be formed in a bridge circuit and the compensation circuit may be assembled into the correction circuit 33 ("High Technology Sensor" by Yamaka, Kyoritsu Publisher, p.116). If there is no change in the output of the displacement detection means when a command signal is issued from the correction circuit 33 or if the control voltage to be applied by the control circuit 32 in response to the command signal is an abnormal value (for example, beyond a permissible range of the bimolf piezoelectric film), the corresponding three-dimensional drive mechanism may be disabled for correction by the microcomputer 1 to disactivate the control circuit 32 so as to stop the recording or the reproduction of the information by the corresponding probe electrode 6, and the correction-disabled three-dimension drive mechanism may be identified by the display (not shown).

Where such a system is formed on a substrate having a semiconductor, a self-alignment apparatus can be provided.

In the above embodiments, the polycrystalline piezo resistive element is used as the strain gauge. Alternatively, the piezo resistive element may be formed in the substrate having the semiconductor by thermal diffusion, or a metal may be used as the strain gauge. The piezoelectric film may be made of a material having a piezoelectric effect such as AlN, TiBaO, PbZrTiO or PbTiO. The effect by the present invention is observed not only in the bimolf driven element but also it is effective in a static electric capacitance driven tunneling current generating probe by Wolfgung Deerel Paul (Japanese Patent Laid-Open Publication No. 62-281138) and a thermal expansion driven cantilever (M. Elwenspoek, Proceedings of IEEE Micro-Electro-Mechanical Systems, 1989, Feb., p126).

In the above embodiments, a plurality of sets of the probe electrodes and the three-dimensional drive mechanisms are used although only one set may be used to detect the error.

The present invention is not limited to the recording and reproducing apparatus but it is applicable to any apparatus which records and reproduces information by a probe such as an observation apparatus or a displacement measurement apparatus (encoder).

We claim:

1. An apparatus for effecting at least one of recording of information on a recording medium and reproduction of information from the recording medium, comprising:

a substrate;

a cantilever which is displaceable and is formed by etching said substrate;

a probe electrode supported on a free end of said cantilever;

a piezoelectric film formed on said cantilever by film formation;

detection means for detecting deformation amount of said cantilever on the basis of a charge amount generated on said piezoelectric film; and means for effecting at least one of recording of information on the recording medium and reproduction of information from the recording medium by use of said probe electrode, wherein when said detection means detects an abnormal deformation amount of said cantilever, the use of said probe electrode is stopped.

2. An apparatus according to claim 1, wherein a plurality of cantilevers are formed on said substrate.

3. An apparatus according to claim 1, wherein said cantilever can be deformed in three-dimensions to cause said probe electrode supported by said cantilever to deform in three-dimensions.

4. An apparatus according to claim 1, wherein said cantilever includes a displacement element for displacing itself.

5. An apparatus according to claim 1, wherein said means for effecting at least one of recording and reproduction includes means for applying a voltage between said probe electrode and the recording medium.

6. An apparatus according to claim 5, further comprising means for detecting current flowing between said probe electrode and the recording medium when voltage is applied by said voltage applying means.

7. An apparatus according to claim 6, wherein the detected current is a tunneling current.

8. A probe unit for effecting at least one of input of information and retrieval of information, comprising:
   a substrate;
   a cantilever which is formed by etching said substrate and is displaceable;
   a probe electrode supported on a free end of said cantilever; and
   a piezoelectric film, formed on said cantilever by film formation, for detecting displacement amount of said cantilever, wherein
   a plurality of piezoelectric films are arranged along a direction perpendicular to a longitudinal direction of said cantilever, and said displacement amount is detected on the basis of a charge amount generated in said piezoelectric films.

9. A probe unit according to claim 8, wherein said cantilever is deformed in three-dimensions to cause said probe supported by said cantilever to deform in three-dimensions.

10. An apparatus for effecting at least one of recording of information on a recording medium and reproduction of information from the recording medium, comprising:
    a substrate;
    a cantilever which is formed by etching said substrate and which is displaceable;
    a probe electrode supported on a free end of said cantilever;
    a piezoelectric film formed on said cantilever by film formation;
    detection means for detecting displacement amount of said cantilever on the basis of a charge amount generated in said piezoelectric film and for outputting an output corresponding to said displacement;
    correction means for correcting said displacement amount of said cantilever on the basis of said output of said detection means; and
    means for effecting at least one of recording of information on the recording medium and reproduction of information from the recording medium by use of said probe electrode.

11. An apparatus for effecting at least one of recording of information on a recording medium and reproduction of information from the recording medium, comprising:
    a substrate;
    a cantilever which is formed by etching said substrate and which is displaceable;
    a probe electrode supported on a free end of said cantilever;
    a piezoresistance element formed on said cantilever by film formation;
    detection means for detecting deformation amount of said cantilever on the basis of resistance change of said piezoresistance element; and
    means for effecting at least one of recording of information on the recording medium and reproduction of information from the recording medium by use of said probe electrode, wherein
    when said detection means detects an abnormal deformation amount of said cantilever, the use of said probe electrode is stopped.

12. An apparatus according to claim 11, wherein a plurality of cantilevers are formed on said substrate.

13. An apparatus according to claim 11, wherein said cantilever can be deformed in three-dimensions to cause said probe electrode supported by said cantilever to deform in three-dimensions.

14. An apparatus according to claim 11, wherein said cantilever includes a displacement element for displacing itself.

15. An apparatus according to claim 11, wherein said means for effecting at least one of recording of information and reproduction of information includes means for applying a voltage between said probe electrode and the recording medium.

16. An apparatus according to claim 15, further comprising means for detecting current flowing between said probe electrode and the recording medium when voltage is applied by said voltage applying means.

17. An apparatus according to claim 16, wherein the detected current is a tunneling current.

18. A probe unit for effecting at least one of input of information and retrieved of information, comprising:
    a substrate;
    a cantilever which is formed by etching said substrate and which is displaceable;
    a probe electrode supported on a free end of said cantilever; and
    a piezoresistance element, formed on said cantilever by film formation, for detecting displacement amount of said cantilever, wherein
    a plurality of piezoresistance elements are arranged along a direction perpendicular to a longitudinal direction of said cantilever and said displacement amount is detected on the basis of resistance change of said piezoresistive elements.

19. A probe unit according to claim 18, wherein said cantilever is deformed in three-dimensions to cause said probe electrode supported by said cantilever to deform in three-dimensions.

20. An apparatus for effecting at least one of recording of information on a recording medium and reproduction of information form the recording medium, comprising:
    a substrate;
    a cantilever which is formed by etching said substrate and which is displaceable;
    a probe electrode supported on a free end side of said cantilever;
    a piezoresistance element formed on said cantilever by film formation;
    detection means for detecting displacement amount of said cantilever on the basis of resistance change of said piezoresistance element and for outputting an output corresponding to the amount of said displacement;

correction means for correcting said displacement of said cantilever on the basis of said output of said detection means; and means for effecting at least one of recording of information on the recording medium and reproduction of information from the recording medium by use of said probe electrode.

* * * * *

UNITED STATES PATENT AND TRADEMARK OFFICE
CERTIFICATE OF CORRECTION

PATENT NO. : 5,313,451
DATED : May 17, 1994
INVENTOR(S) : Yagi et al.

It is certified that error appears in the above-indentified patent and that said Letters Patent is hereby corrected as shown below:

Title page, item [56] References Cited:

FOREIGN PATENT DOCUMENTS, "37-281138  12/1962  Japan" should read --62-281138  12/1987  Japan--.

COLUMN 1:

Line 56, "malfuction" should read --malfunction--.

COLUMN 2:

Line 12, "dimension" should read --dimensional--.

COLUMN 3:

Line 68, "ÅA" should read --Å--.

COLUMN 4:

Line 8, "A(N film" should read --AℓN film--.
Line 39, "bimolf" should read --bimorph--.
Line 63, "three-dimension drive" should read --three-dimensional drive--.

COLUMN 5:

Line 57, "bimolf" should read --bimorph--.

UNITED STATES PATENT AND TRADEMARK OFFICE
CERTIFICATE OF CORRECTION

PATENT NO. : 5,313,451
DATED : May 17, 1994
INVENTOR(S) : Yagi et al.

It is certified that error appears in the above-indentified patent and that said Letters Patent is hereby corrected as shown below:

COLUMN 6:

Line 14, "bimolf" should read --bimorph--.
Line 20, "three-dimension" should read --three-dimensional--.
Line 34, "bimolf" should read --bimorph--.
Line 36, "Wolfgung Deerel Paul" should read --Wolfgang D. Pohl--.

COLUMN 8:

Line 38, "retrieved" should read --retrieval--.
Line 58, "form" should read --from--.

Signed and Sealed this

Thirteenth Day of December, 1994

Attest:

BRUCE LEHMAN

Attesting Officer       Commissioner of Patents and Trademarks